US010128698B2

(12) United States Patent
Lewis et al.

(10) Patent No.: US 10,128,698 B2
(45) Date of Patent: Nov. 13, 2018

(54) DEVICE AND METHOD FOR DETECTING AN OBJECT WITHIN A WIRELESS CHARGING REGION

(71) Applicants:Hyundai America Technical Center, Inc, Superior Township, MI (US); Hyundai Motor Company, Seoul (KR); Kia Motors Corporation, Seoul (KR)

(72) Inventors: Allan Lewis, Windsor (CA); Bilal Javaid, Ada, MI (US)

(73) Assignees: Hyundai America Technical Center, Inc, Superior Township, MI (US); Hyundai Motor Company, Seoul (KR); Kia Motors Corporation, Seoul (KR)

( * ) Notice: Subject to any disclaimer, the term of this patent is extended or adjusted under 35 U.S.C. 154(b) by 96 days.

(21) Appl. No.: 15/186,603

(22) Filed: Jun. 20, 2016

(65) Prior Publication Data

US 2017/0366049 A1    Dec. 21, 2017

(51) Int. Cl.
| | |
|---|---|
| *H02J 7/00* | (2006.01) |
| *H02J 50/70* | (2016.01) |
| *H02J 50/80* | (2016.01) |
| *H02J 50/10* | (2016.01) |
| *H02J 50/60* | (2016.01) |
| *B60L 11/18* | (2006.01) |
| *H02J 7/02* | (2016.01) |

(52) U.S. Cl.
CPC ............ *H02J 50/70* (2016.02); *B60L 11/182* (2013.01); *B60L 11/1829* (2013.01); *B60L 11/1838* (2013.01); *H02J 7/025* (2013.01); *H02J 50/10* (2016.02); *H02J 50/60* (2016.02); *H02J 50/80* (2016.02)

(58) Field of Classification Search
CPC .. H02J 50/70; H02J 50/80; H02J 50/10; H02J 7/025; H02J 50/60; B60L 11/182; B60L 11/1892; B60L 11/1829; B60L 11/1838; B60L 2230/32; B60Y 2200/91; G01R 27/2605; Y02T 10/7022; Y02T 90/122
See application file for complete search history.

(56) References Cited

U.S. PATENT DOCUMENTS

| | | | |
|---|---|---|---|
| 2009/0284892 A1* | 11/2009 | Miyano | H02N 1/006 361/211 |
| 2012/0242285 A1 | 9/2012 | Jung et al. | |
| 2013/0069441 A1 | 3/2013 | Verghese et al. | |
| 2013/0163635 A1 | 6/2013 | Karanth et al. | |

(Continued)

FOREIGN PATENT DOCUMENTS

WO    WO 2014/037405 A1 *    3/2014    ............. B60L 11/18

*Primary Examiner* — Vuthe Siek
(74) *Attorney, Agent, or Firm* — Mintz Levin Cohn Ferris Glovsky and Popeo, P.C.; Peter F. Corless

(57) ABSTRACT

An assembly and method are provided for detecting an object within a wireless charging region of an electric vehicle. The method includes applying by a controller, a voltage to the wireless charging region to generate a capacitance value and measuring by the controller, the capacitance value of an electromagnetic shield disposed on the underside of the vehicle. Further, the controller monitors the capacitance value of the electromagnetic shield; and the controller detects a change in the capacitance value when the object enters the wireless charging region.

19 Claims, 10 Drawing Sheets

(56) References Cited

U.S. PATENT DOCUMENTS

| | | |
|---|---|---|
| 2013/0249682 A1 | 9/2013 | Van Wiemeersch et al. |
| 2014/0111019 A1 | 4/2014 | Roy et al. |
| 2014/0253500 A1* | 9/2014 | Curtis .................. G06F 1/3262 345/174 |
| 2015/0215002 A1* | 7/2015 | Ho ...................... H04B 5/0012 345/174 |
| 2016/0031332 A1* | 2/2016 | Garcia Briz .......... B60L 11/182 320/108 |
| 2017/0201254 A1* | 7/2017 | Hanssen ............. H03K 17/962 |

* cited by examiner

RELATED ART            RELATED ART

DEVICE AND METHOD FOR DETECTING AN OBJECT WITHIN A WIRELESS CHARGING REGION

BACKGROUND

1. Field of the Invention

The present invention relates to wireless charging of an electric vehicle, and more particularly, to a device that detects an object within a wireless charging region.

2. Description of the Related Art

Generally, an electric vehicle is charged when an electric charge is applied (e.g., via plug in methods). Recently, wireless power transfer systems and methods have been developed to wirelessly charge the electric vehicle. These wireless charging systems (e.g., power transfer) provide a driver with increased conveniences compared with current plug-in methods.

Wireless charging systems for vehicles according to the related art utilize capacitive sensing systems to charge the vehicle. However, the electrode design and sensing circuitry are not utilized to operate the charging system (e.g., adjust the charging rate or varying the charge). The disadvantage of such charging systems is the lack of control of the charging system based on factors external to the vehicle that impact the charging function of the vehicle. For example, a disturbance in the charging region (e.g., area where the vehicle is charged such as a charging station) may reduce or delay charging of the vehicle.

In another area of related art, foreign objects are detected within wireless energy transfer systems. In particular, various types of objects are detected for generic wireless power transfer systems. For example, a technique utilizes capacitive sensing. However, the sensing is not disposed within an electric vehicle nor is it adapted (e.g., able to provide adequate power) for use in an electric vehicle.

FIG. 1 shows a charging configuration that includes parallel plate capacitor according to the related art. In particular, a parallel plate capacitor enables two conductors to store an electrical field between the plates. For example, one parallel plate may have a V+ charge and the other parallel plate may have a V− charge. Theoretically, the capacitance between the two conductors is equal, but the opposite chargeq, and voltage differentialV, is calculated from the following equation: C=q/V. For example, when a dielectric material (e.g., a material with high permittivity) is placed between the conductors, the capacitance may increase. Accordingly, the voltage differential may decrease without changing (e.g., adjusting) the charge, thus producing a higher capacitance.

FIGS. 2A-2B show another parallel plate capacitor of the related art having a fixed voltage. In particular, FIGS. 2A-2B show that when a voltage is fixed and a dialectic material enters the charge region, the capacitance increases within a charge region because the dielectric material enables an additional dielectric charge to accumulate. For example, FIG. 2A shows an electrical field formed between a positive plate to a negative plate. Additionally, FIG. 2B shows a reduced electrical field when a dielectric object enters the charge region. The dielectric material polarizes and creates an induced electrical field in the opposite direction of the applied electrical field. For example, dielectric materials include water, plastic, glass, Teflon and living organisms composed primarily of water (e.g., mammals). In the related art, capacitive sensing is a method of proximity sensing by measuring the change or variation in capacitance when a dielectric material approaches a sensor electrode. Typically dielectric sensing is used in touchscreens, accelerometers or fluid level sensors.

To decrease the risk of an object disrupting the charging of a vehicle in a charging region, object detection techniques are required to facilitate proper charging of the vehicle. For example, when an object enters the charging region disposed on the underside of the vehicle, the object could be subject to excessive heat or be impacted by the high energy magnetic fields. Additionally, when a metallic object enters the charging region, the efficiency of the power transfer may be reduced and the metallic object may be subjected to excessive heating. Accordingly, it would be advantageous to provide a system that detects objects, including metallic objections within the charging region.

The above information disclosed in this section is merely for enhancement of understanding of the background of the invention and therefore it may contain information that does not form the prior art that is already known in this country to a person of ordinary skill in the art.

SUMMARY

The present invention provides wireless charging of an electric vehicle, and more particularly, a device and method that detect an object within a wireless charging region.

In one aspect of the present exemplary embodiment, a method that detecting an object within a wireless charging region of an electric vehicle may include applying a voltage, by a controller, to the wireless charging region to generate a capacitance value and measuring the capacitance value of an electromagnetic shield disposed on the underside of the vehicle. The capacitance value may be monitored by the controller and a change in the capacitance value may be detected when the object enters the wireless charging region.

Furthermore, a charge may be adjusted based on the detection of the object due to a change in the capacitance value. A charge may be terminated based on the detection of the object due to change in the capacitance value. A driver may be alerted of the change in the capacitance value. A type of object that may change the capacitance value may be identified.

In some aspects, the electromagnetic shield may include a plurality of plates positioned in parallel to each other. Additionally, a baseline capacitance value of an electromagnetic shield disposed on the underside of the vehicle may be generated by the controller.

In another aspect, the thermal value of a thermal gradient of the wireless charging region may be monitored. A change in the thermal values of thermal gradient of the wireless charging region may be detected and may indicate presence of the object in the wireless charging region. Furthermore, the charging region may be coupled to both a chassis ground and a local ground.

In another exemplary embodiment, an electromagnetic shield assembly for an electric vehicle, may include a base layer coupled to an underside of the vehicle, a conductive layer having a ground connection to the vehicle and disposed on the base layer, and a capacitive sensing electrode electrically connected to a capacitance sensing circuit coupled to an interlayer disposed on the conductive layer. Further, a magnetic field coupling layer may be connected to the interlayer, wherein a plurality of bonding layers may be disposed between each layer.

The electromagnetic shield assembly may include a plurality of plates positioned in parallel to each other. The electromagnetic shield may be coupled to the underside of the vehicle body. The electromagnetic shield assembly may be rotatably positioned parallel to a chassis frame of the vehicle during operation of the vehicle. Alternatively, the electromagnetic shield assembly may be rotatably positioned perpendicular to the chassis frame of the vehicle during charging of the vehicle.

In other aspects, the capacitive sensing electrode may be disposed on a lower portion of the electromagnetic shield assembly. The base layer may be formed of a non-conductive material. The interlayer may be formed of a non-conductive material. In some exemplary embodiments a thickness of the base layer, the conductive layer, the interlayer or the magnetic field coupling layer may be about 1 mm to about 2 mm. A thickness of the capacitive sensing electrode may be about 1 mm to about 2 mm.

Notably, the present invention is not limited to the combination of the detection elements of an object within a wireless charging region of an electric vehicle as listed above and may be assembled in any combination of the elements as described herein.

Other aspects of the invention are disclosed infra.

BRIEF DESCRIPTION OF THE DRAWINGS

The exemplary embodiments herein may be better understood by referring to the following description in conjunctions with the accompanying drawings in which like reference numerals indicate identically or functionally similar elements, of which.

DETAILED DESCRIPTION

Figure 1:
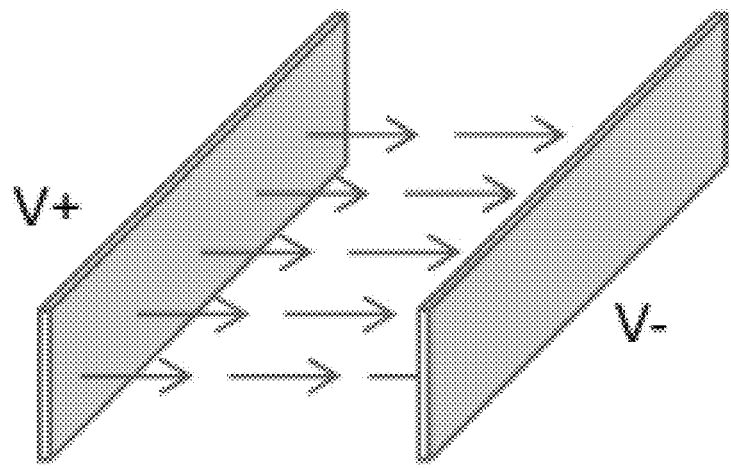
FIG. 1 is a view of a capacitor plate arrangement according the related art.
Figures 2A, 2B:
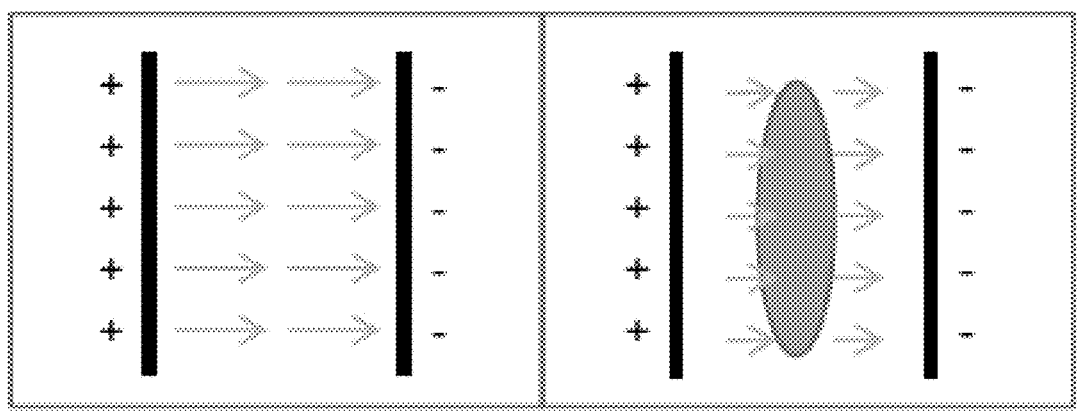
FIGS. 2A and 2B are views of a capacitor plate arrangement according the related art.

The presently disclosed subject matter will be described more fully hereinafter with reference to the accompanying drawings, in which some, but not all exemplary embodiments of the inventions are shown. Like reference numerals refer to like elements throughout. The presently disclosed subject matter may be embodied in many different forms and should not be construed as limited to the exemplary embodiments set forth herein; rather these exemplary embodiments are provided so that this disclosure will satisfy applicable legal requirements. Indeed, many modifications and other exemplary embodiments of the presently disclosed subject matter set forth herein will come to mind to one skilled in the art to which the presently disclosed subject matter pertains, having the benefit of the teachings presented in the foregoing descriptions and the associated drawings. Therefore, it is to be understood that the presently disclosed subject matter is not to be limited to the specific exemplary embodiments disclosed and that modifications and other exemplary embodiments are intended to be included within the scope of the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

In one aspect, the present invention is directed to detecting an object within a wireless charging region of an electric vehicle. In particular, the present invention provides a device and method that detect an object within a wireless charging region based on a variation in a capacitance value. The method of detecting an object within a wireless charging region of an electric vehicle may include applying, by a controller, a voltage to the wireless charging region to generate a capacitance value and measuring the baseline capacitance value of an electromagnetic shield disposed on the underside of the vehicle. The capacitance value may then be monitored throughout the operation of a charging process. A variation in the capacitance value may be detected when an object enters the wireless charging region.

Figure 3:
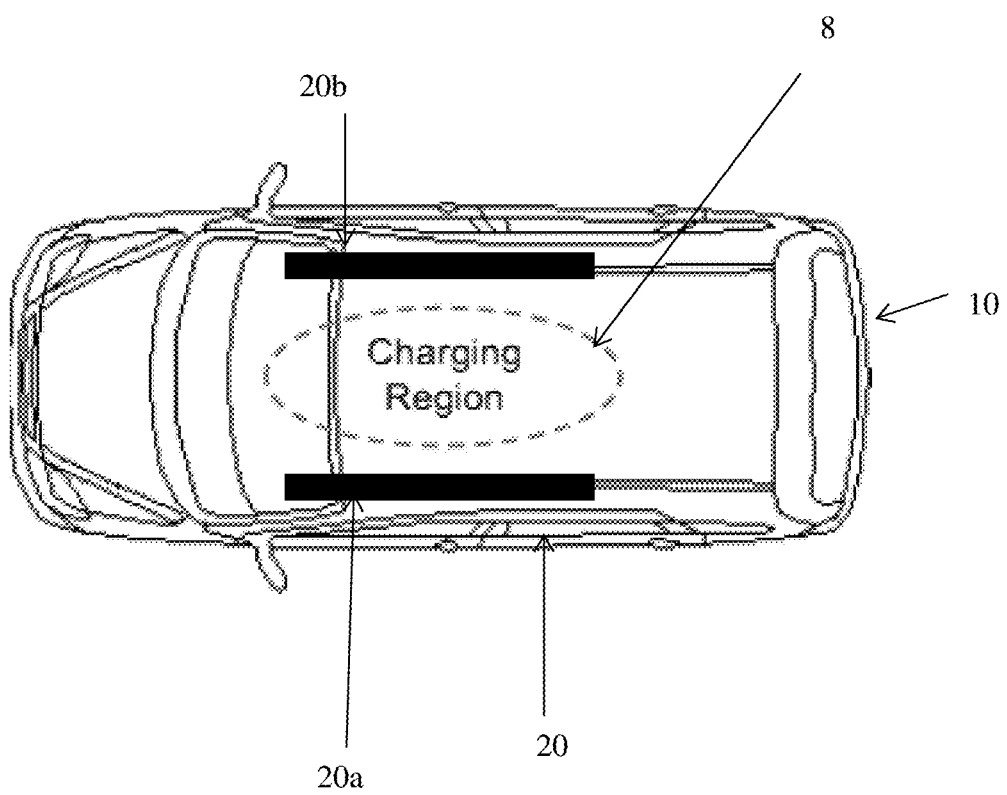
FIG. 3 shows a top view of a capacitor plate arrangement disposed within a vehicle according to an exemplary embodiment of the present invention.

FIG. 3 illustrates a view of an electromagnetic shield 20 that may include capacitive plates 20a and 20b disposed on the underside of a vehicle 10 according to an exemplary embodiment of the present invention. As illustrated in FIG. 3, electromagnetic shield 20 may include a pair of capacitive plates 20a and 20b positioned in parallel to one another that provide the charging region 8. In particular, the capacitive plates 20a and 20b may include capacitive sensing electrodes. For example, when an object enters the charging region 8 disposed between the pair of capacitive plates 20a and 20b, the relative permittivity of the charging region 8 changes and the capacitive value may also change. Namely, an embedded controller (e.g., micro controller) may be configured to receive a signal related to the capacitance values and trigger a response to detecting the object which may include adjustment or termination of an active charging operation. The capacitive detection will be described in further detail herein below.

Figure 4:
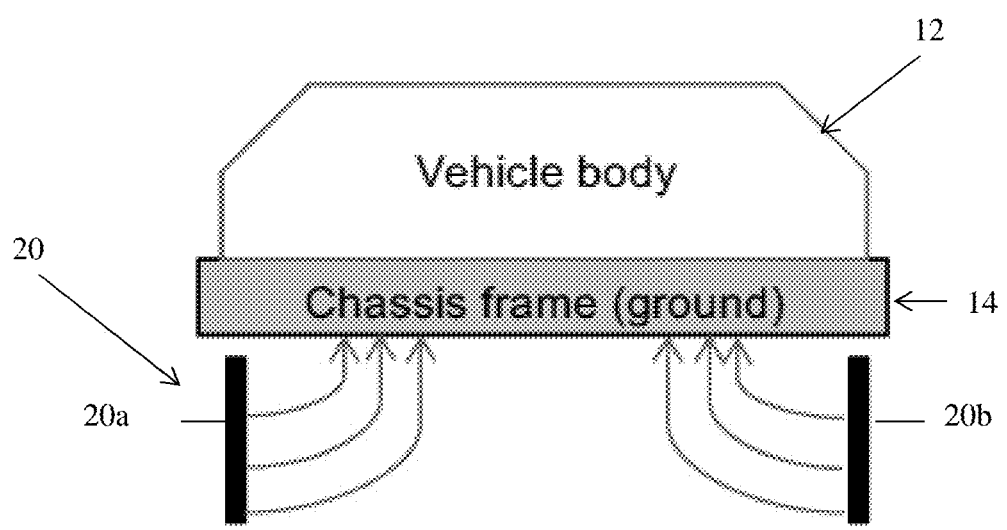
FIG. 4 shows a front view of a capacitor plate arrangement disposed within a vehicle according to an exemplary embodiment of the present invention.

As illustrated in FIG. 4, the electromagnetic field assembly 20 including the capacitive plates 20a and 20b may be disposed beneath a chassis frame 14 and may be coupled to the chassis frame 14 on the underside of the vehicle body 12. The electromagnetic shield 20 includes the capacitive plates 20a and 20b that may be designed to extend perpendicular to the chassis frame 14 when the vehicle is stopped during an electrical charging condition. Further, during operation of the vehicle, the electromagnetic shield including the charging plates may retract and may be positioned parallel to the underside of the chassis frame. In particular, the electromagnetic shields may provide electric and magnetic field shielding to improve the efficiency and safety of a wireless charging system. Further, the electromagnetic shields may include a capacitive sensing circuit that may use the electrical conducts and sensing electrodes. In some, exemplary embodiment's additional conductive layers may be included within the electromagnetic shield assembly.

Figure 5:
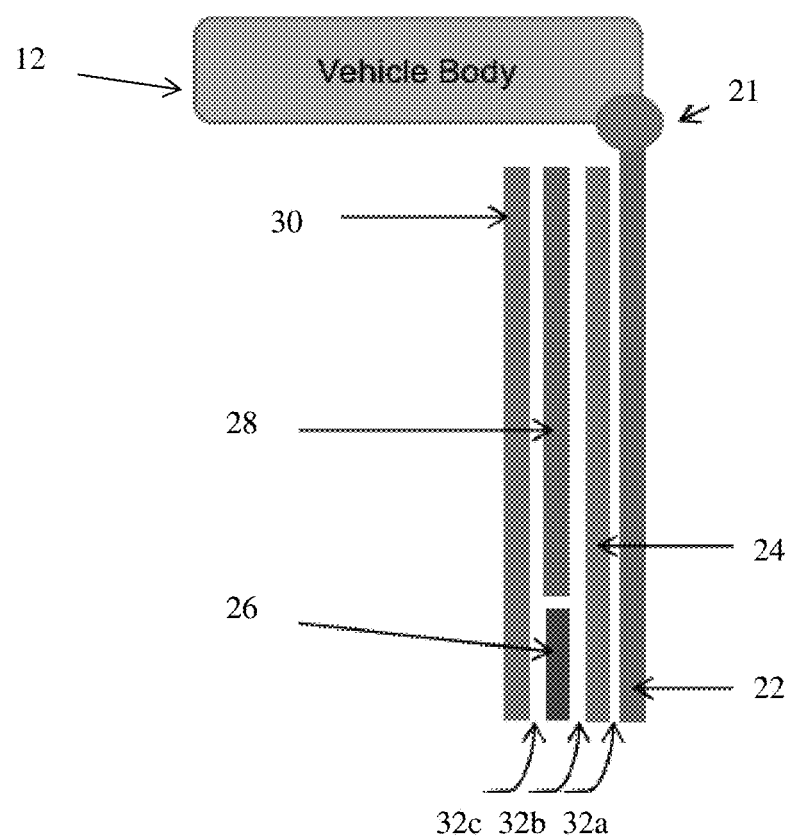
FIG. 5 is a cross-sectional view of an electro-magnetic shield assembly according to an exemplary embodiment of the present invention.

Furthermore, with respect to FIG. 5 which illustrates a cross sectional view of an electromagnetic shield assembly, the electromagnetic shield assembly may include capacitive sensing electrodes. Specifically, as seen in FIG. 5, the electromagnetic shield assembly 20 may include a four layer shield with capacitive sensing abilities disposed therein. For example, the electromagnetic shield assembly 20 may include a base layer 22 coupled to an underside of the electric vehicle. The base layer 22 may be formed of a rigid plastic or the like and may be coupled to the vehicle body 12 via a hinge 21 connection to enable rotational movement of the shield assembly 20. The base layer 22 may have a thickness of about 1 mm to about 2 mm. The electromagnetic shield assembly 20 may further include a conductive layer 24 that may provide a ground connection to the electric vehicle and may be disposed proximate to the base layer 22. The conductive layer 24 may be formed of aluminum or other conductive material to serve as an electric field shielding layer. Typically, the thickness of the conductive layer 24 may be about 1 mm to about 2 mm.

An interlayer 28 may be positioned proximate to the conductive layer 24 and may include a capacitive sensing electrode 26 electrically connected to a capacitance sensing circuit coupled to the interlayer 28. The interlayer 28 may be formed from a plastic material or the like and may have a thickness of about 1 mm to about 2 mm. The capacitive sensing electrodes 26 may have a thickness of about 1 mm to about 2 mm and may extend along a portion of the length or the full length of the interlayer 28. Additionally, a magnetic field coupling layer 30 may be connected to the interlayer 28. The magnetic field coupling 30 layer may be formed from ferrite or the like and may have a thickness of about 1 mm to about 2 mm. Further, bonding layers 32a, 32b and 32c may be disposed between each of the functional layers discussed above.

Figure 6:
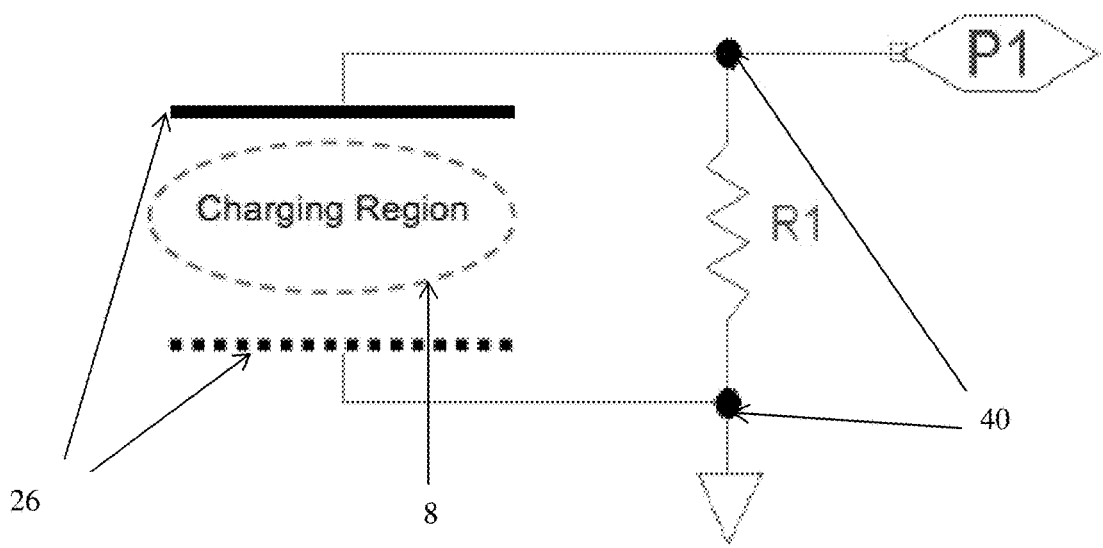
FIG. 6 is a schematic view of capacitive sensing circuit according to the related art.

FIG. 6 illustrates a schematic view of capacitive sensing circuit (e.g., a relaxation oscillator) according to the related art. In particular, FIG. 6 shows that the sensing electrode 26 may be connected to general-purpose input/output (GPIO) pins 40 on both sides of the vehicle. For example, to provide a sensing electrode voltage within the charging operation of an electric vehicle, the vehicle chassis frame at a ground potential must be considered. In other words, the chassis frame at ground potential forms a region of reduced sensitivity in the lower middle portion of the charging region. Thus, any potential capacitive sensing operation may be improved by placing a positive voltage on both capacitive plates as opposed to one positive and one ground. In other words, as seen in FIG. 6, a capacitive sensing circuit may include a controller (e.g., micro controller) configured to output about 5 V on one of the GPIO pins (e.g., P1) to charge the capacitor. Further, the controller may be configured to switch to a high impedance input that enables the capacitor to begin to discharge through the resistor (e.g., R1). Notably, a larger capacitance value that may be attributed to an object within the charging region may result in an increased discharge time and the controller may be configured to detect the change in discharge time.

Figure 8:
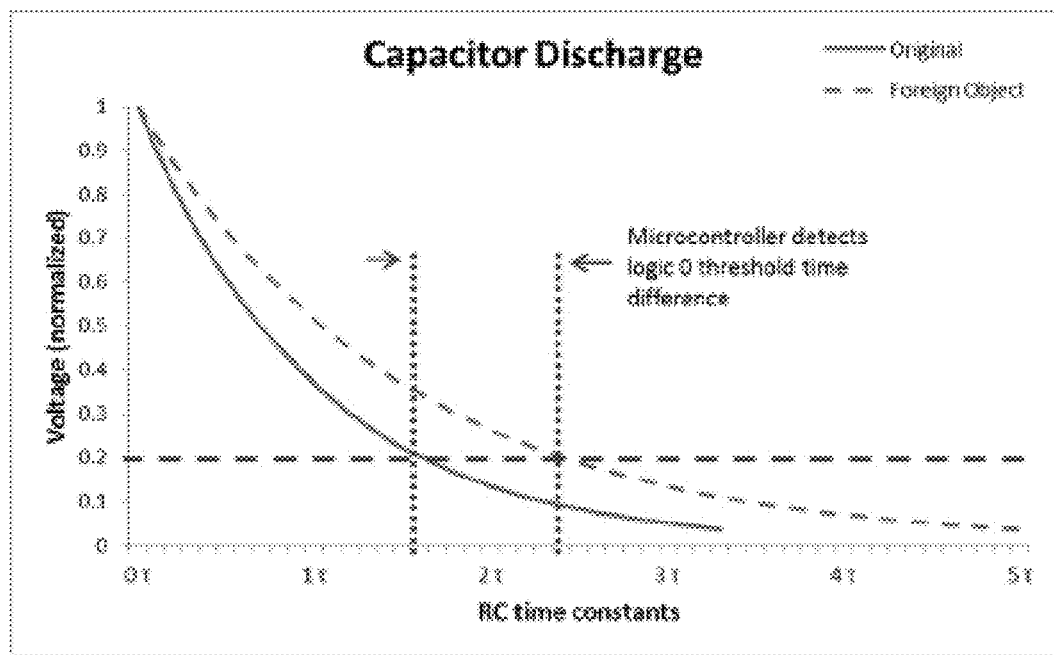
FIG. 8 is a graphical representation of a capacitor discharge according to according the related art.

Additionally, to improve the capacitive sensing capabilities of the wireless power transfer system, further sources of noise may be considered. For example, the coils of the wireless power transfer system may affect the capacitive values during active charging. In particular, the coils may produce about an 85 khz signal that may be superimposed over the capacitive value. Another mode of noise may disturb the discharge waveform (as shown in FIG. 8). Further experimentation may determine the effect of the coils on the wireless power transfer system with respect to the capacitive sensing measurement. Accordingly, a method to calculate superimposed signal may be generated.

Figure 7:
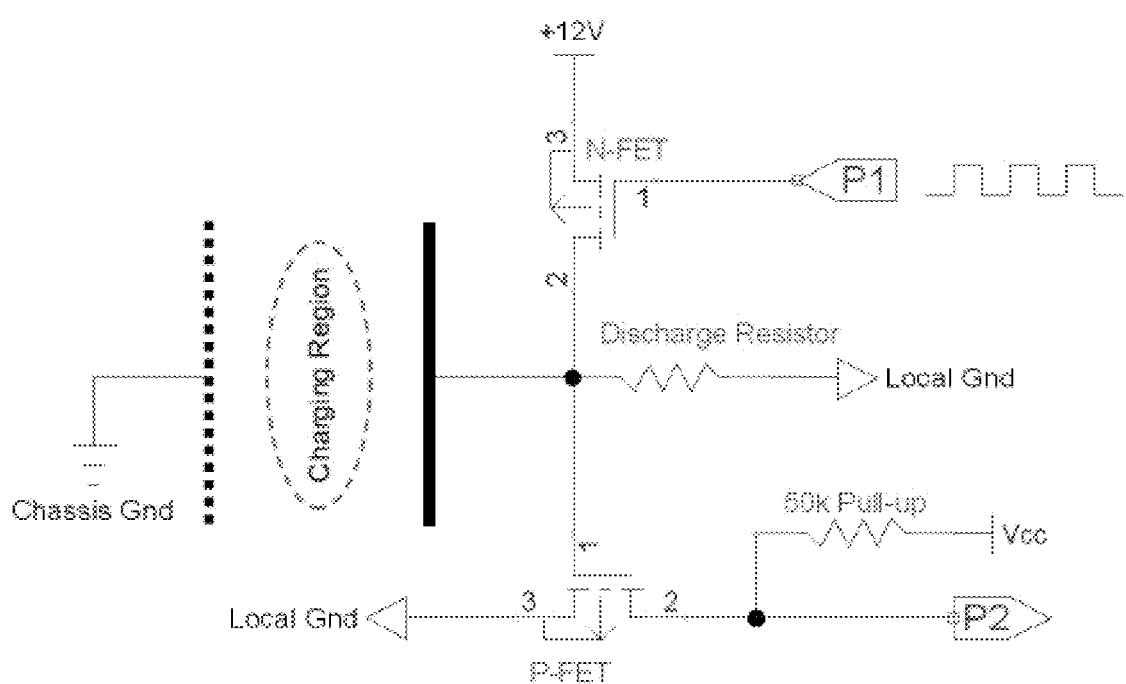
FIG. 7 a schematic view of capacitive sensing circuit according to an exemplary embodiment of the present invention.

Moreover, FIG. 7 is a schematic view of a capacitive sensing circuit according to an exemplary embodiment of the present invention. As seen in FIG. 7 a circuit that produces a higher voltage on the capacitive sensing electrodes may produce an increased potential difference and may improve the measurement ability of the sensor. For example, a battery voltage may be applied to the capacitor in place of a controller supply voltage. As shown in FIG. 7, a switching function may engage or disengage a battery configured to supply about 12V to the circuit. In other embodiments alternate voltage systems (e.g., 48V) system may be used. The charging region may be coupled to both the chassis ground and the local ground. Further, the chassis ground and the local ground may be connected; however a minimal resistance may be presented therebetween. Then, as seen in FIG. 7, an N-FET component may have a low leakage current. A discharge resistor may be about 6MΩ, however the value may vary based on the electrode design. In other words, the noise immunity from the external radiators that include the electromagnetic fields from the wireless power transfer may be improved and may thereby provide improved sensor accuracy.

In particular, FIG. 7 shows a circuit that may use an increased voltage applied to the capacitive sensing electrodes. As the voltage on the excitation signal (P1) increases, a timer function may be initiated. Then, the excitation signal (P1) may be reduced, and the electrode may discharge through a discharge resistor. The discharge time may depend on the capacitance. Upon such a discharge, the electrode voltage may reach a value of less than about 1V and the output signal (P2) may be reduced below predetermined level and the timer function may be terminated.

In further detail, FIG. 8 illustrates a graphical representation of a capacitor discharge according to according the related art. As shown in FIG. 8 when the microcontroller adjusts to a high-impedance input, the time duration to reach a low voltage (e.g., zero voltage) signal may be monitored. Particularly, when the capacitor discharges, the voltage level may produce a known waveform as shown in FIG. 8. The voltage across the capacitor during discharge may be described as: $V(t) = V_0 e^{-t/\tau}$ where t is time, $V_0$ is initial voltage, and $\tau = RC$, where R is the resistance value and C is the capacitance. When the capacitance value is greater than a baseline (e.g., an initial measured value), $\tau$ may be adjusted and the duration for the voltage to be reduced to a pre-determined level may be adjusted. For example, the controller may include a timer configured to be operated when the capacitor begins to discharge. The controller may be configured to detect when the voltage is reduced below a predetermined threshold (e.g., about less than 0.2 volts). Further, when the voltage is reduced below the predetermined threshold, the timer may terminate and the time duration may be recorded. The approximate ratio of a recorded time to baseline discharge time may be about equal to the ratio of second capacitance to baseline capacitance value. As shown in FIG. 8 the difference may be represented by the difference between the solid and dotted waveforms.

Figure 9:
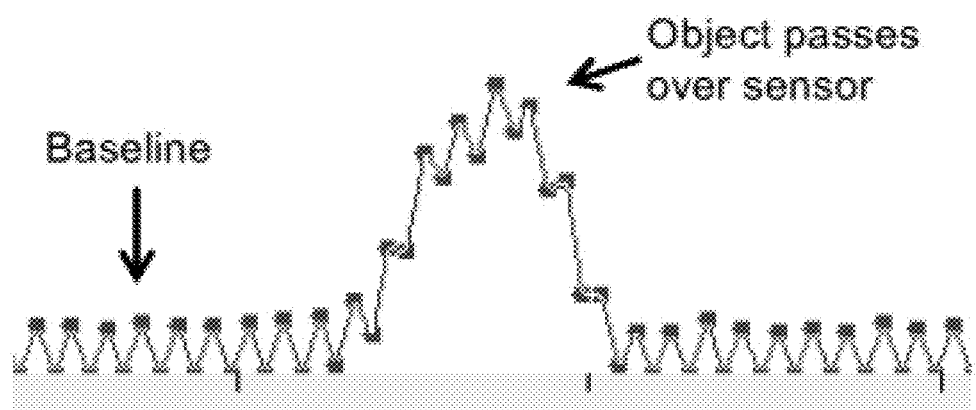
FIG. 9 is a graphical representation of a capacitor sensing data according to an exemplary embodiment of the present invention.

Accordingly, as shown in FIG. 9 the measured capacitive sensor data generated by a sensor may be represented by a percentage change in capacitance. For example, FIG. 9 represents an illustration of a signal after the calculation of the variance of the capacitance values. As shown in FIG. 9 when an object is not present within the charging region, a baseline value is produced. The y-axis represents a percentage change in capacitance that indicates presences of an object within the charging region. Upon removal of the object from the charging region the capacitance value may return to the baseline value.

Figure 10:
FIG. 10 is a graphical representation of a capacitor sensing model and simulation according to an exemplary embodiment of the present invention.
Figure 11:
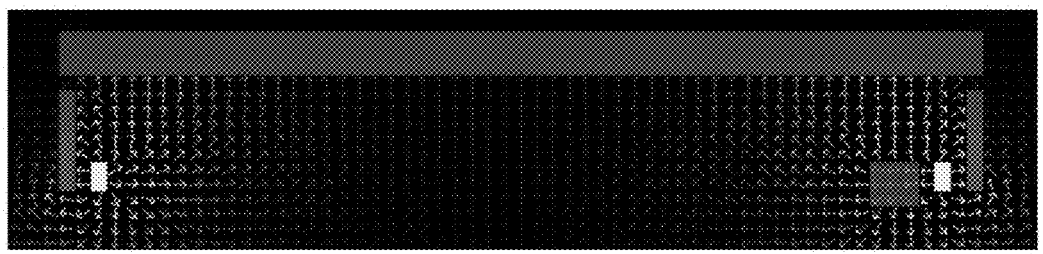
FIG. 11 is another graphical representation of a capacitor sensing model and simulation according to an exemplary embodiment of the present invention.

In another aspect, FIGS. 10 and 11 illustrate a graphical representation of a capacitor sensing model and simulation according to an exemplary embodiment of the present invention. Referring first to FIG. 10, a model of the capacitive sensing electrodes is depicted. In particular, the arrows proximate to the capacitive sensing electrode arrows indicate the strongest electric field region. The electric field may be reduced as the arrows extend outward from the capacitive sensing electrodes, with a relatively weak electric field disposed in the center of the vehicle chassis frame. For example, in the experimental embodiment a rectangular conductor was used as a model for the vehicle chassis and was disposed above the electromagnetic shields. The experimental model (as shown in FIG. 5) includes multiple conductors of the electromagnetic shields having a positive voltage prior to discharge. As shown in FIG. 9, the middle portion of the charging region under the vehicle has the weakest electric field strength from the capacitive sensing electrode. Additionally, the middle portion also produces the lowest sensitivity due to the presence of an object disposed within that portion causing a minimal change in capacitance.

Referring now to FIG. 11 as compared to FIG. 10 adjustments were made to the sensing electrode configuration. For example, a ground shield was disposed on the outer portion of the electromagnetic shield assembly. In another embodiment, an active shield may be placed on the outer portion instead of the ground shield. The active shield may follow the voltage on the sense electrode and may thereby improve the system performance. An active shield may follow the voltage on the sense electrode and may improve the system performance to provide sensitivity in a particular direction. In particular, wiring between the sensing electrode and the capacitive sensing circuit board may be a coaxial cable where the inner conductor may connect to the sense electrode and the outer conductor may be the active shield. In other words, external radiation noise from coupling the sensing electrode wire may be reduced. Accordingly, the electric field may be shielded from the exterior of the vehicle boundaries and thus may significantly reduce the sensitivity to objects on the exterior of the vehicle external to the charging region.

Furthermore, the positively charged sensing electrode may be disposed on the lower portion of the electromagnetic shield assembly. Conversely, as shown compared with FIG. 10 an object may cause a greater relative change in capacitance. As shown in FIG. 11, the baseline/intrinsic capacitance to ground may be reduced as compared to when the capacitance sensing electrode extends the height of the electromagnetic shield assembly. However, when an object approaches the sensing electrode, a greater percent change may be observed since a greater portion of the total electric field passes through the object. As shown in FIG. 11, the object proximate to the electromagnetic shield assembly may cause the path of the electric field to be disrupted around the object which may cause a change in the capacitance value produced.

Moreover, a complete system for detecting objects may require adjustment in the baseline calculation to identify an object such as a conductive coin disposed within the charging region prior to initiation of the charging function. Unless the object is identified in the baseline, the object may become part of the baseline and may not be subsequently detected. The temperature of the object may also increase to unsafe levels. A complete object detection system may include the combination of capacitive sensing with additional technologies to form a complete foreign object detection system. For example, detection system may provide identification of a change in mutual inductance of a conductive object disposed between the charging coils. Accordingly, a change or variation may result in the power transmission across the air gap and may be detected by monitoring electrical parameters (e.g. voltage, current, phase angle) on either the primary or secondary systems. For example, when the secondary system detects a reduction in the power received while the output power from the primary remains constant, the power reduction may be due to an object in the charging region. Additionally, to detect small objects that are disposed in the charging region (e.g., coins or conductive fragments) a temperature sensor may be used to detect thermal variations of the charging region. For example, a thermal sheet with an integrated sensor array may be used in conjunction with the electromagnetic shield assembly to detect and locate objects that may cause a thermal variation.

As discussed above, the detection of an object within a wireless charging region of an electric vehicle of the claimed invention is capable of improving the safety of electric vehicle wireless charging systems by detecting objects present within the charging region. The particular design of the detection of the object may alert the driver or take steps to remove the object from the charging region. Additionally, pattern recognition may be used to determine the type of detected object. Accordingly, the detection of an object within a wireless charging region of an electric vehicle of the present invention may be capable of preventing disruptions to the wireless charging process and improving the wireless charging efficiency.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of detecting an object within a wireless charging region of an electric vehicle, comprising:
    applying, by a controller, a voltage to the wireless charging region to generate a capacitance value;
    measuring, by the controller, the capacitance value of an electromagnetic shield disposed on the underside of the vehicle;
    monitoring, by the controller, the capacitance value of the electromagnetic shield;
    detecting, by the controller, a change in the capacitance value when the object enters the wireless charging region;
    identifying, by the controller, a type of the object which changes the capacitance value; and
    generating, by the controller, a baseline reference capacitance value of an electromagnetic shield disposed on the underside of the vehicle.

2. The method of claim 1, further comprising:
    adjusting, by the controller, a charge to the vehicle based on the detection of the object due to the capacitance value change.

3. The method of claim 1, further comprising:
    terminating, by the controller, a charge to the vehicle based on the detection the object due to the capacitance value change.

4. The method of claim 1, further comprising:
    alerting, by the controller, a driver of the change in the capacitance value.

5. The method of claim 1, wherein the electromagnetic shield includes a plurality of plates positioned in parallel to each other.

6. The method of claim 1, further comprising
    monitoring, by the controller, thermal values of thermal gradient of the wireless charging region.

7. The method of claim 1, further comprising:
    detecting, by the controller, a change in the thermal values of thermal gradient of the wireless charging region to indicate presence of the object in the wireless charging region.

8. The method of claim 1, wherein the charging region may be coupled to both a chassis ground and a local ground.

9. An electromagnetic shield assembly for an electric vehicle, comprising:
    a base layer coupled to an underside of the vehicle;
    a conductive layer having a ground connection to the vehicle and disposed on the base layer;
    a capacitive sensing electrode electrically connected to a capacitance sensing circuit coupled to an interlayer disposed on the conductive layer; and
    a magnetic field coupling layer connected to the interlayer,
    wherein a plurality of bonding layers are disposed between each layer.

10. The assembly of claim 9, wherein the electromagnetic shield assembly includes a plurality of plates positioned in parallel to each other.

11. The assembly of claim 9, wherein the base layer is rotatably coupled to the underside of the vehicle body.

12. The assembly of claim 9, wherein the electromagnetic shield assembly is rotatably positioned parallel to a chassis frame of the vehicle during operation of the vehicle.

13. The assembly of claim 9, wherein the electromagnetic shield assembly is rotatably positioned perpendicular to the chassis frame of the vehicle during charging of the vehicle.

14. The assembly of claim 9, wherein the capacitive sensing electrode is disposed on a lower portion of the electromagnetic shield assembly.

15. The assembly of claim 9, wherein the base layer is formed of a non-conductive material.

16. The assembly of claim 9, wherein the interlayer is formed of a non-conductive material.

17. The assembly of claim 9, wherein a thickness of the base layer, the conductive layer, the interlayer or the magnetic field coupling layer is about 1 mm to about 2 mm.

18. The assembly of claim 9, wherein a thickness of the capacitive sensing electrode is about 1 mm to about 2 mm.

19. A method of detecting an object within a wireless charging region of an electric vehicle, comprising:
    applying, by a controller, a voltage to the wireless charging region to generate a capacitance value;
    measuring, by the controller, the capacitance value of an electromagnetic shield disposed on the underside of the vehicle;
    monitoring, by the controller, the capacitance value of the electromagnetic shield;
    detecting, by the controller, a change in the capacitance value when the object enters the wireless charging region; and
    generating, by the controller, a baseline reference capacitance value of an electromagnetic shield disposed on the underside of the vehicle.

* * * * *